United States Patent
Shih

(10) Patent No.: US 7,936,344 B2
(45) Date of Patent: May 3, 2011

(54) PIXEL STRUCTURE WITH IMPROVED VIEWING ANGLE

(75) Inventor: Po-Sheng Shih, Tao-Yuan Hsien (TW)

(73) Assignee: Hannstar Display Corporation, Tao-Yuan Hsien (TW)

( * ) Notice: Subject to any disclaimer, the term of this patent is extended or adjusted under 35 U.S.C. 154(b) by 968 days.

(21) Appl. No.: 11/681,951

(22) Filed: Mar. 5, 2007

(65) Prior Publication Data
US 2007/0153146 A1    Jul. 5, 2007

Related U.S. Application Data

(63) Continuation-in-part of application No. 11/119,773, filed on May 3, 2005, now abandoned.

(51) Int. Cl.
*G09G 3/36* (2006.01)
*G06F 3/038* (2006.01)
(52) U.S. Cl. ............... 345/204; 345/690; 345/87
(58) Field of Classification Search ............ 345/87–102, 345/204, 690
See application file for complete search history.

(56) References Cited

U.S. PATENT DOCUMENTS

| | | | |
|---|---|---|---|
| 6,710,372 B2 * | 3/2004 | Kim .......................... | 257/72 |
| 7,034,789 B2 * | 4/2006 | Takeuchi et al. .......... | 345/90 |
| 2007/0243650 A1 * | 10/2007 | Kim et al. ................. | 438/38 |

OTHER PUBLICATIONS

Yoshida, et al.; "Multi-Domain Vertically Aligned LCDs with Super-Wide Viewing Range for Gray-Scale Images;" Fujitsu Display Technologies Corporation, Kawasaki, Japan.
Takeda, et al.; "A Super-High Image Quality Multi-Domain Vertical Alignment LCD by New Rubbing-Less Technology;" Fujitsu Limited.

* cited by examiner

*Primary Examiner* — Duc Q Dinh
(74) *Attorney, Agent, or Firm* — Thomas, Kayden, Horstemeyer & Risley, LLP

(57) ABSTRACT

The present invention provides a liquid crystal display with a plurality of pixel units. Each pixel unit includes two sub-pixels. Each sub-pixel includes a thin film transistor, a liquid crystal capacitor and a storage capacitor. One of the storage capacitors is a changeable capacitor. By the changeable capacitor, two different data voltages are generated in respective sub-pixels during adjacent frames. The different data voltages are symmetrical with respect to a common voltage to improve image quality.

12 Claims, 8 Drawing Sheets

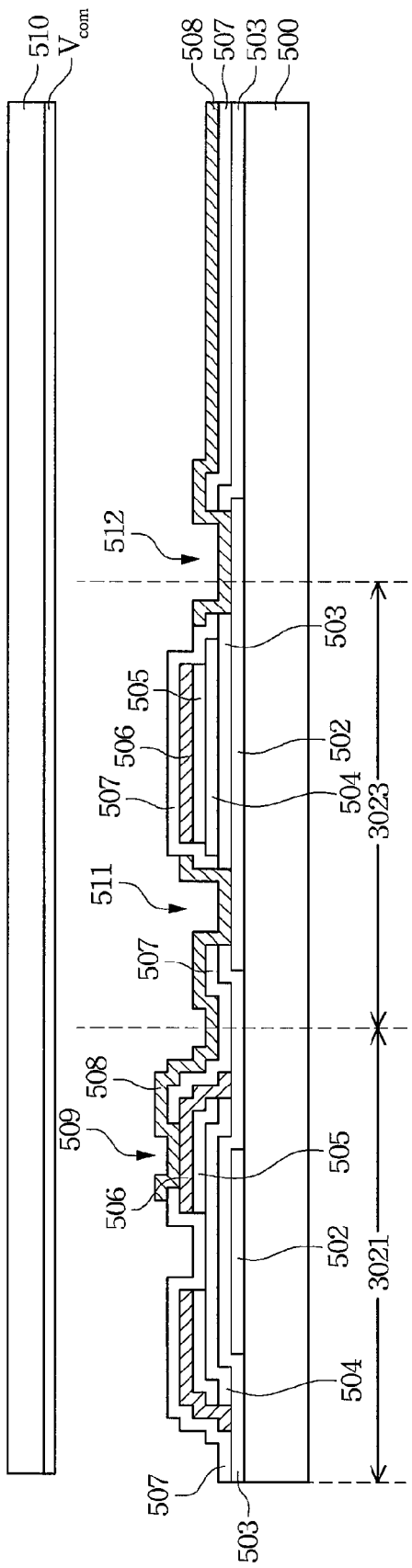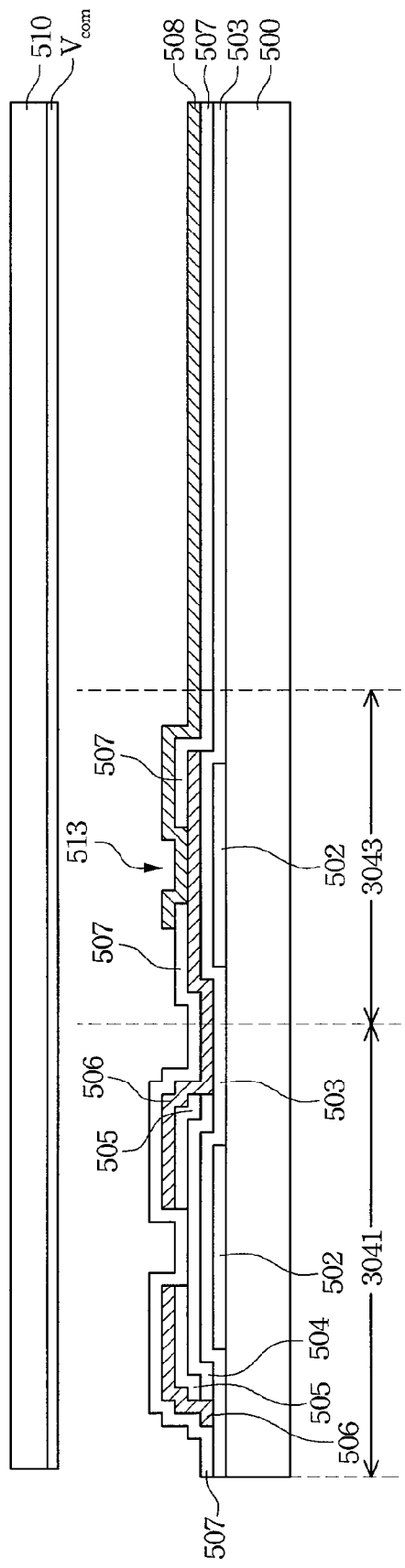
Fig. 5A
Fig. 5B

PIXEL STRUCTURE WITH IMPROVED VIEWING ANGLE

CROSS REFERENCE TO RELATED APPLICATIONS

This application is a Continuation-in-part of application Ser. No. 11/119,773 filed May 3, 2005 hereby incorporated by reference as it fully set forth herein.

FIELD OF THE INVENTION

The present invention relates to a pixel structure, and more particularly to a pixel unit with improved viewing angles of a liquid crystal display.

BACKGROUND OF THE INVENTION

Liquid crystal displays have been widely applied in electrical products, such as computer monitors and TV monitors, for a long time. To provide a wider viewing range, Fujitsu commercialized a multi-domain vertically aligned liquid crystal display (MVA-LCD) in 1997). MVA has almost perfect viewing angle characteristics. However, a notable weak point is that the skin color of Asian people (light orange or pink) appears whitish from an oblique viewing direction.

The solid line in FIG. 1 shows the transmittance-voltage (T-V) characteristics of the MVA in the normal direction. The vertical axis is the transmittance rate. The horizontal axis is the applied voltage. When the applied voltage increases, the transmittance rate curve 101 in the normal direction also increases. The transmittance changes monotonically as the applied voltage increases. However, in the oblique direction, the transmittance rate curve 102 winds and the various gray scales become the same. Especially in the region 100, the transmittance changes decrease as the applied voltage increases. This is the main reason that the skin color of Asian people appears or whitish from an oblique viewing direction.

A method is provided to improve this foregoing problem. This method combines two different T-V characteristics. The dashed line 201 in FIG. 2 shows the original T-V characteristics in the oblique viewing direction. The dashed line 202 in FIG. 2 shows other T-V characteristics with a higher threshold voltage. By optimizing the threshold voltage and the maximum transmittance of these two lines, monotonic characteristics can be achieved, as shown by the solid line 203 in FIG. 2. According to the typical method, each pixel is divided into two areas. One area has the original threshold voltage and the other area has a higher one.

There is a residual image problem in the typical method. According to the typical method, each pixel unit includes a plurality of sub-pixels. Each sub-pixel may generate different voltage changes after the voltage applied to the pixel unit is removed. The different voltage change may generate different data voltage in two adjacent frames when corresponding to a common electrode, which may affect the image quantity.

Therefore, it is also an objective to improve the image quality.

SUMMARY OF THE INVENTION

Accordingly, the present invention provides a liquid crystal display comprises a first substrate and a plurality of data lines and a plurality of scan lines arranged in the first substrate, wherein the scan lines cross the data lines to define a plurality of pixel units, each pixel unit including a first sub-pixel and a second sub-pixel, wherein each pixel unit comprises a first transistor located in the first sub-pixel, the first transistor has a gate electrode coupled to a first scan line, a drain electrode coupled to a first data line and a source electrode coupled to a first storage capacitor and a second transistor located in the second sub-pixel, the second transistor has a gate electrode coupled to the first scan line, a drain electrode coupled to the first data line and a source electrode coupled to a second storage capacitor, wherein at least one of the first storage capacitors and the second storage capacitor is a changeable capacitor.

According to another embodiment of the present invention, a liquid crystal display driving method is provided. The liquid crystal display has a plurality of pixel units, each pixel unit includes a first sub-pixel with a first transistor and a second sub-pixel with a second transistor, wherein the gate electrodes of the first transistor and the second transistor couple to a first scan line, and the drain electrodes of the first transistor and the second transistor couple to a first data line. The method comprises providing a high level electric potential to the first scan line for writing a data signal transferred in the first data line to a pixel electrode in the first sub-pixel and a pixel electrode in the second sub-pixel and to provide a low level electric potential to the first scan line to isolate the first transistor and the second transistor from the first data line. According to this method, in a first frame of two adjacent frames, when the first scan line is transferred from the high level electric potential to the low level electric potential, a first voltage change happens in the pixel electrode of the first sub-pixel and a second voltage change happens in the pixel electrode of the second sub-pixel, and in a second frame, when the first scan line is transferred from the high level electric potential to the low level electric potential, a third voltage change happens in the pixel electrode of the first sub-pixel and a fourth voltage change happens in the pixel electrode of the second sub-pixel, wherein at least the first voltage change is not equal to the third voltage change.

BRIEF DESCRIPTION OF THE DRAWINGS

The foregoing aspects and many of the attendant advantages of this invention will become more readily appreciated and better understood by referencing the following detailed description, when taken in conjunction with the accompanying drawings, wherein:

FIG. 5A illustrates a cross-sectional view of a sub-pixel in accordance with the first embodiment of the present invention;

FIG. 5B illustrates a cross-sectional view of a sub-pixel in accordance with the first embodiment of the present invention;

DETAILED DESCRIPTION OF THE PREFERRED EMBODIMENT

Without limiting the spirit and scope of the present invention, the pixel unit structure proposed in the present invention is illustrated with a plurality of embodiments. One with ordinary skill in the art, upon acknowledging the embodiments, can apply the pixel unit structure and the operation method of the present invention to various liquid crystal displays. Reference will now be made in detail to the preferred embodiments of the present invention, examples of which are illustrated in the accompanying drawings.

First Embodiment

Figure 1:
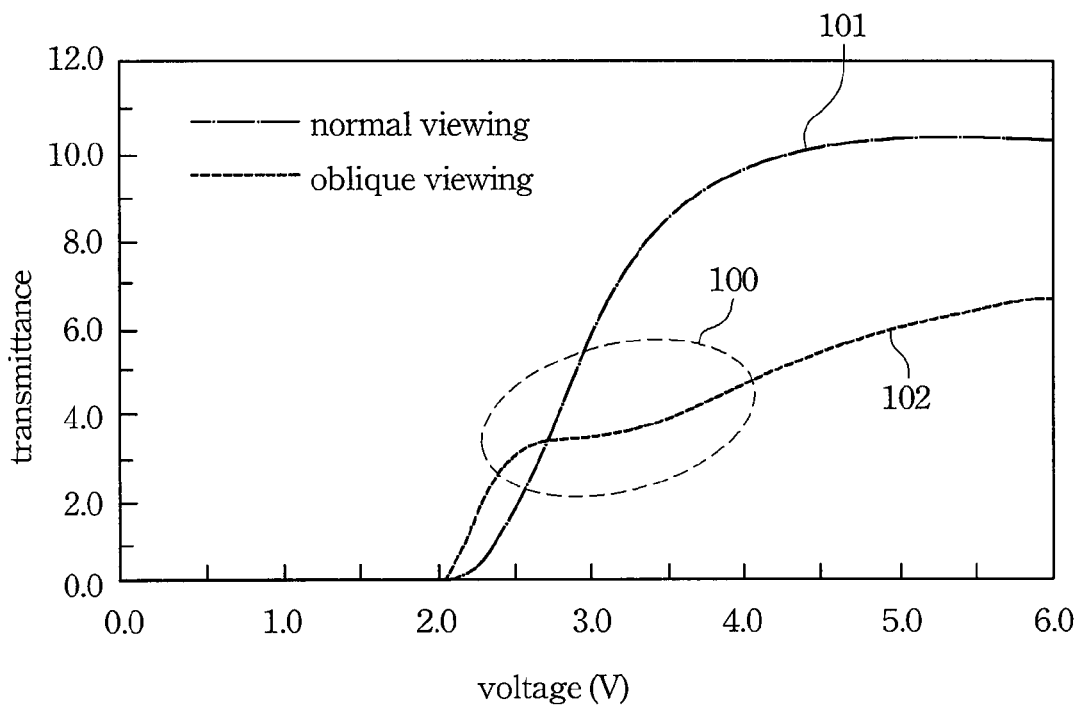
FIG. 1 illustrates a transmittance-voltage (T-V) characteristic of the MVA in the normal and oblique directions.
Figure 2:
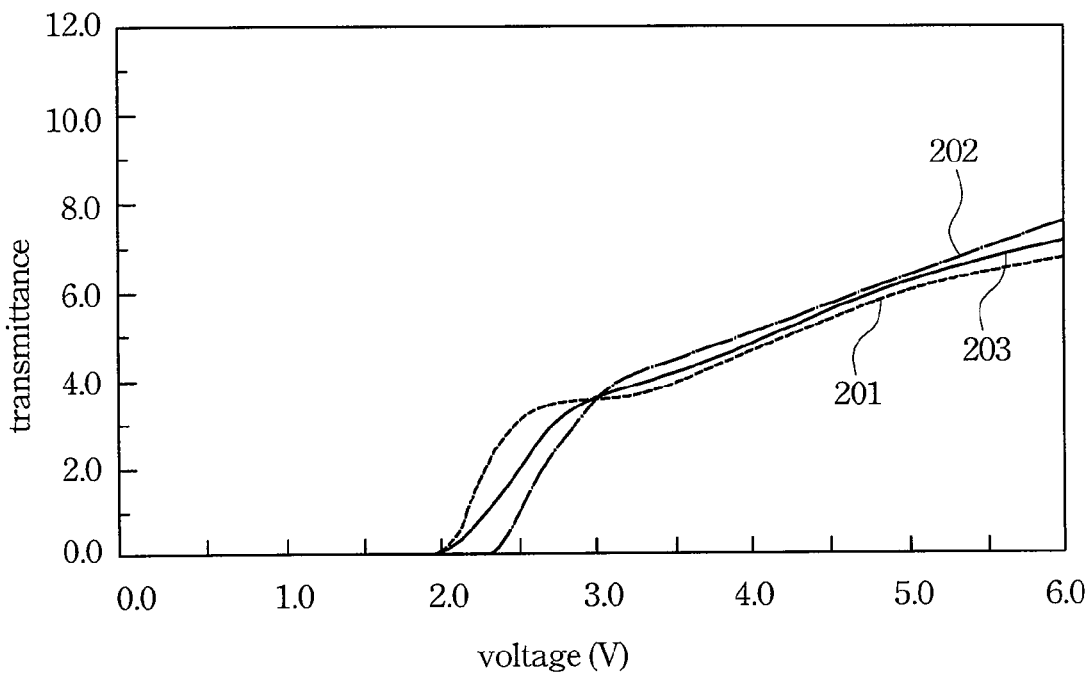
FIG. 2 illustrates the combination T-V characteristics in the oblique direction.
Figure 3:
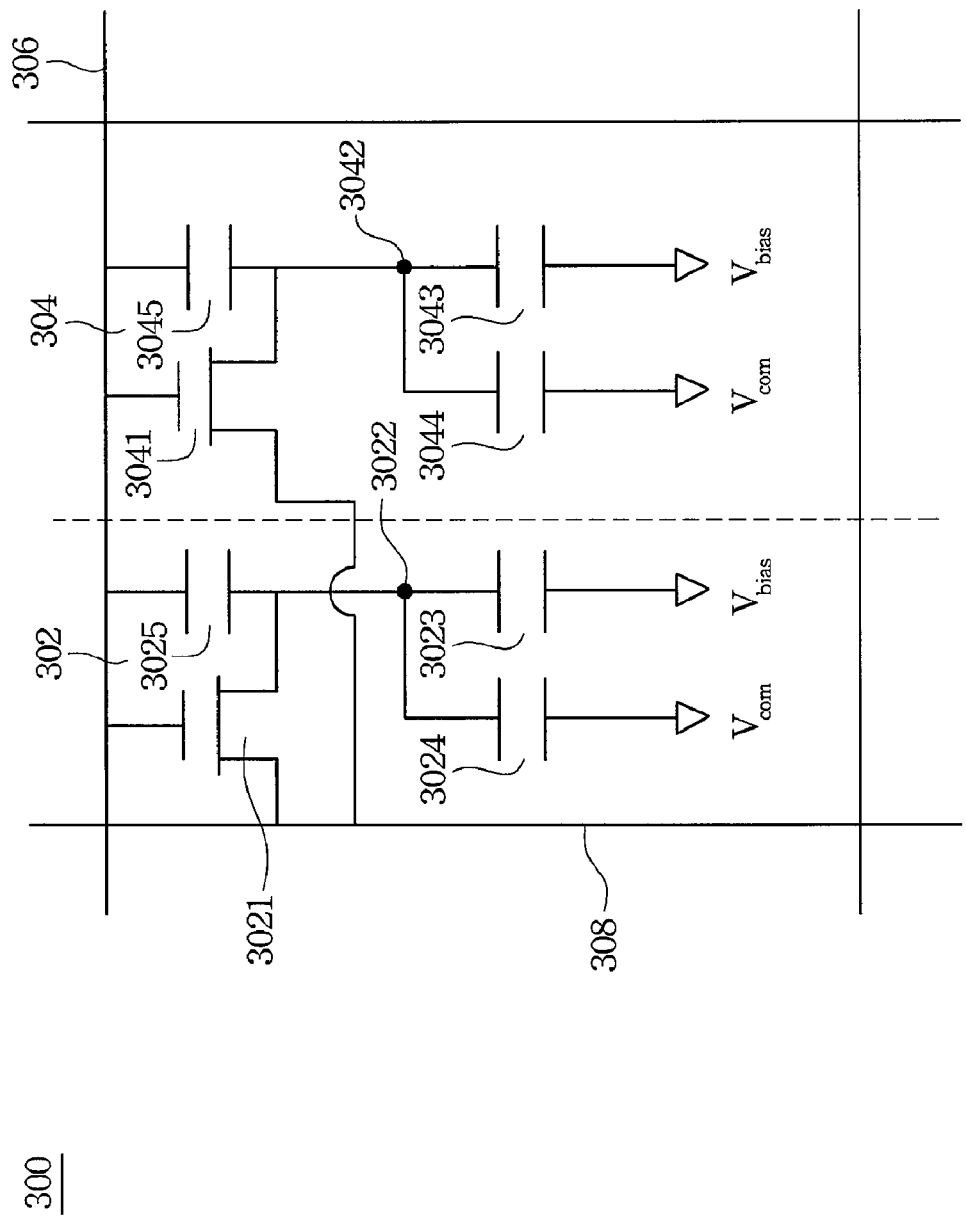
FIG. 3 illustrates a schematic diagram of a pixel unit according to the first embodiment of the present invention.

FIG. 3 is a schematic diagram of a pixel unit according to the first embodiment of the present invention. The pixel unit 300 includes two sub-pixels 302 and 304.

The sub-pixel 302 includes a thin film transistor 3021. According to the thin film transistor 3021, the gate electrode is connected to the scanning line 306, the drain electrode is connected to the data line 308 and the source electrode is connected to the pixel electrode 3022. The storage capacitor 3023 is composed of the pixel electrode 3022 and the bias electrode $V_{bias}$. The liquid crystal capacitor 3024 is composed of the pixel electrode 3022 and the common electrode $V_{com}$. A diffusion capacitor 3025 exists between the gate and the source electrode of the thin film transistor 3021.

The sub-pixel 304 includes a thin film transistor 3041. According to the thin film transistor 3041, the gate electrode is connected to the scanning line 306, the drain electrode is connected to the data line 308 and the source electrode is connected to the pixel electrode 3042. The storage capacitor 3043 is composed of the pixel electrode 3042 and the bias electrode $V_{bias}$. The liquid crystal capacitor 3044 is composed of the pixel electrode 3042 and the common electrode $V_{com}$. A diffusion capacitor 3045 exists between the gate and the source electrode of the thin film transistor 3041.

In this embodiment, a metal-insulator-semiconductor-metal structure, MIS structure, is used to form the storage capacitor 3023. A metal-insulator-metal structure is used to form the storage capacitor 3043.

Figure 4B:
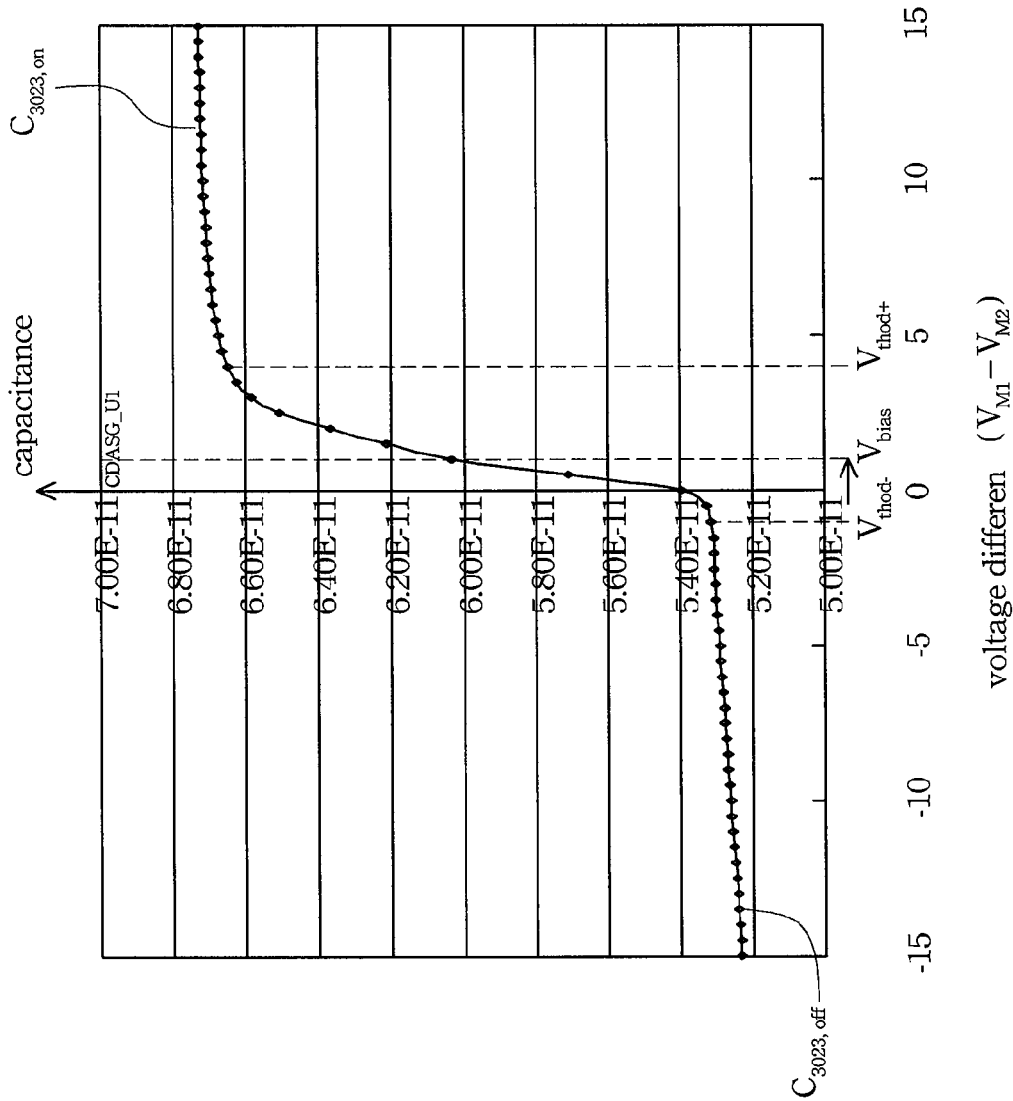
FIG. 4B illustrates a capacitance-voltage characteristic of a metal-insulator-semiconductor capacitor.
Figure 4A:
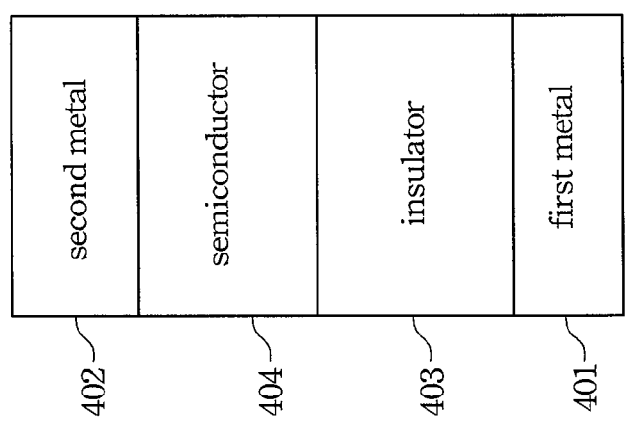
FIG. 4A illustrates a schematic structure diagram of a metal-insulator-semiconductor capacitor.

FIG. 4A is a schematic diagram of the storage capacitor 3023 with a metal-insulator-semiconductor-metal structure. An insulator layer 403 and a semiconductor layer 404 are located between the first metal layer 401 and the second metal layer 402. The metal-insulator-semiconductor (MIS) structure forms a capacitor. The capacitance of a MIS capacitor is changeable and related to the value of the voltage difference $(V_{M1}-V_{M2})$ between the first metal layer 401 and the second metal layer 402. FIG. 4B illustrates a relation diagram between the capacitance and the voltage difference value $(V_{M1}-V_{M2})$. When the voltage $(V_{M1})$ applied to the first metal layer 401 is larger than the voltage $(V_{M2})$ applied to the second metal layer 402, that is the voltage difference value $(V_{M1}-V_{M2})$ is larger than zero, the capacitance increases when the voltage difference value increases. When the voltage $(V_{M1})$ applied to the first metal layer 401 is less than the voltage $(V_{M2})$ applied to the second metal layer 402, that is the voltage difference value $(V_{M1}-V_{M2})$ is less than zero, the capacitance decreases when the voltage difference value increases.

The curve in the FIG. 4B is not symmetrical around the origin. Therefore, a bias voltage $V_{bias}$ is applied to the first metal layer 401 or the second metal layer 402 to shift the original point to make the curve symmetrical around the shifted origin. In this case, when the voltage difference value $(V_{M1}-V_{M2})$ is larger than the positive threshold voltage value $(V_{thod+})$ or less than the negative threshold voltage value $(V_{thod-})$, the capacitance tends to a specific positive value or a specific negative value. In this embodiment, the capacitor may generate the capacitance $C_{3023, on}$ when a voltage difference value that is larger than the positive threshold voltage value $(V_{thod+})$ is applied to this capacitor. The capacitor may generate the capacitance $C_{3023, off}$ when the voltage difference value that is less than the negative threshold voltage value $(V_{thod-})$ is applied to this capacitor. Moreover, the capacitor with a metal-insulator-semiconductor (MIS) structure as illustrated in FIG. 4A is called a changeable capacitor or voltage control capacitor, VCCAP.

Many pixel structure types may be used to form the pixel unit 300. FIG. 5A and FIG. 5B illustrates one of the pixel structure types. FIG. 5A is a schematic diagram of the thin film transistor 3021 and the metal-insulator-semiconductor (MIS) storage capacitor 3023 in the sub-pixel 302. FIG. 5B is a schematic diagram of the thin film transistor 3041 and the metal-insulator-metal (MIM) storage capacitor 3043 in the sub-pixel 304. In FIG. 5A, in sub-pixel 302, the common electrode $V_{com}$ is formed over a glass substrate 510. The thin film transistor 3021 and the metal-insulator-semiconductor (MIS) storage capacitor 3023 are formed over a glass substrate 500. A metal layer 502 is formed over the glass substrate 500 to serve as the gate metal of the thin film transistor 3021 and the first metal layer 401 (shown in the FIG. 4A) of the storage capacitor 3023. An insulator layer 503 is formed over the glass substrate 500 to cover the metal layer 502 to serve as the gate insulator of the thin film transistor 3021 and the insulator layer 403 (shown in the FIG. 4A) of the storage capacitor 3023. An amorphous silicon layer 504 and an n+ amorphous silicon layer 505 are sequentially formed over the gate insulator of the thin film transistor 3021 and the insulator layer 403 of the storage capacitor 3023. The amorphous silicon layer 504 and the n+ amorphous silicon layer 505 formed over the gate insulator are used as an active region of the thin film transistor 3021. The amorphous silicon layer 504 and the n+ amorphous silicon layer 505 formed over the insulator layer 403 (shown in the FIG. 4A) are used as the semiconductor layer 404 (shown in the FIG. 4A) of the storage capacitor 3023. A metal layer 506 is formed over the n+ amorphous silicon layer 505. The metal layer 506, the amorphous silicon layer 504 and the n+ amorphous silicon layer 505 form the source and the drain electrode structure. A metal layer 506 formed over the semiconductor layer 404 (shown in the FIG. 4A) is used as the second metal layer 402 (shown in the FIG. 4A) of the storage capacitor 3023. A passivation layer 507 is formed over the glass substrate 500 to cover the source and the drain electrode structure of the thin film transistor 3021 and the second metal layer 402 (shown in the FIG. 4A) of the storage capacitor 3023. A plurality of through holes 509, 511 and 512 are formed in the passivation layer 507. The through hole 509 is used to expose the source electrode of the thin film transistor 3021. The through holes 511 and 512 are used to expose the first metal layer of the storage capacitor 3023. An indium tin oxide, ITO, layer 508 is formed over the passivation layer 507 to connect with the source electrode of the thin film transistor 3021 and the first metal layer of the storage capacitor 3023 to serve as the pixel electrode of the sub-pixel 302. The diffusion capacitor 3025 (shown in the FIG. 3) is composed of the gate metal layer 502 and the source electrode structure of the thin film transistor 3021. The liquid crystal capacitor 3024 (shown in the FIG. 3) is composed of the ITO layer 508 and the common electrode $V_{com}$ formed over the glass substrate 510.

In FIG. 5B, in sub-pixel 304, the common electrode $V_{com}$ is formed over the glass substrate 510. The thin film transistor 3041 and the metal-insulator-metal (MIM) storage capacitor 3043 are formed over the glass substrate 500. A metal layer 502 is formed over the glass substrate 500 to serve as the gate metal of the thin film transistor 3041 and the first electrode of the storage capacitor 3043. An insulator layer 503 is formed over the glass substrate 500 to cover the metal layer 502 to serve as the gate insulator of the thin film transistor 3041 and the insulator layer of the storage capacitor 3043. An amorphous silicon layer 504 and an n+ amorphous silicon layer 505 sequentially formed over the gate insulator are used as an active region of the thin film transistor 3041. A metal layer 506 is formed over the n+ amorphous silicon layer 505. The metal layer 506, the amorphous silicon layer 504 and the n+ amorphous silicon layer 505 form the source and the drain electrode structure of the thin film transistor 3041. The metal layer 506 is also used as the second electrode of the storage capacitor 3043. A passivation layer 507 is formed over the glass substrate 500 to cover the source and the drain electrode structure of the thin film transistor 3041 and the second electrode of the storage capacitor 3043. A through hole 513 is formed in the passivation layer 507 to expose the second electrode of the storage capacitor 3043. An indium tin oxide, ITO, layer 508 is formed over the passivation layer 507 to connect with the second electrode of the storage capacitor 3043. The diffusion capacitor 3045 (shown in the FIG. 3) is composed of the gate metal layer 502 and the source electrode structure of the thin film transistor 3041. The liquid crystal capacitor 3044 (shown in the FIG. 3) is composed of the ITO layer 508 and the common electrode $V_{com}$ formed over the glass substrate 510.

Figure 6:
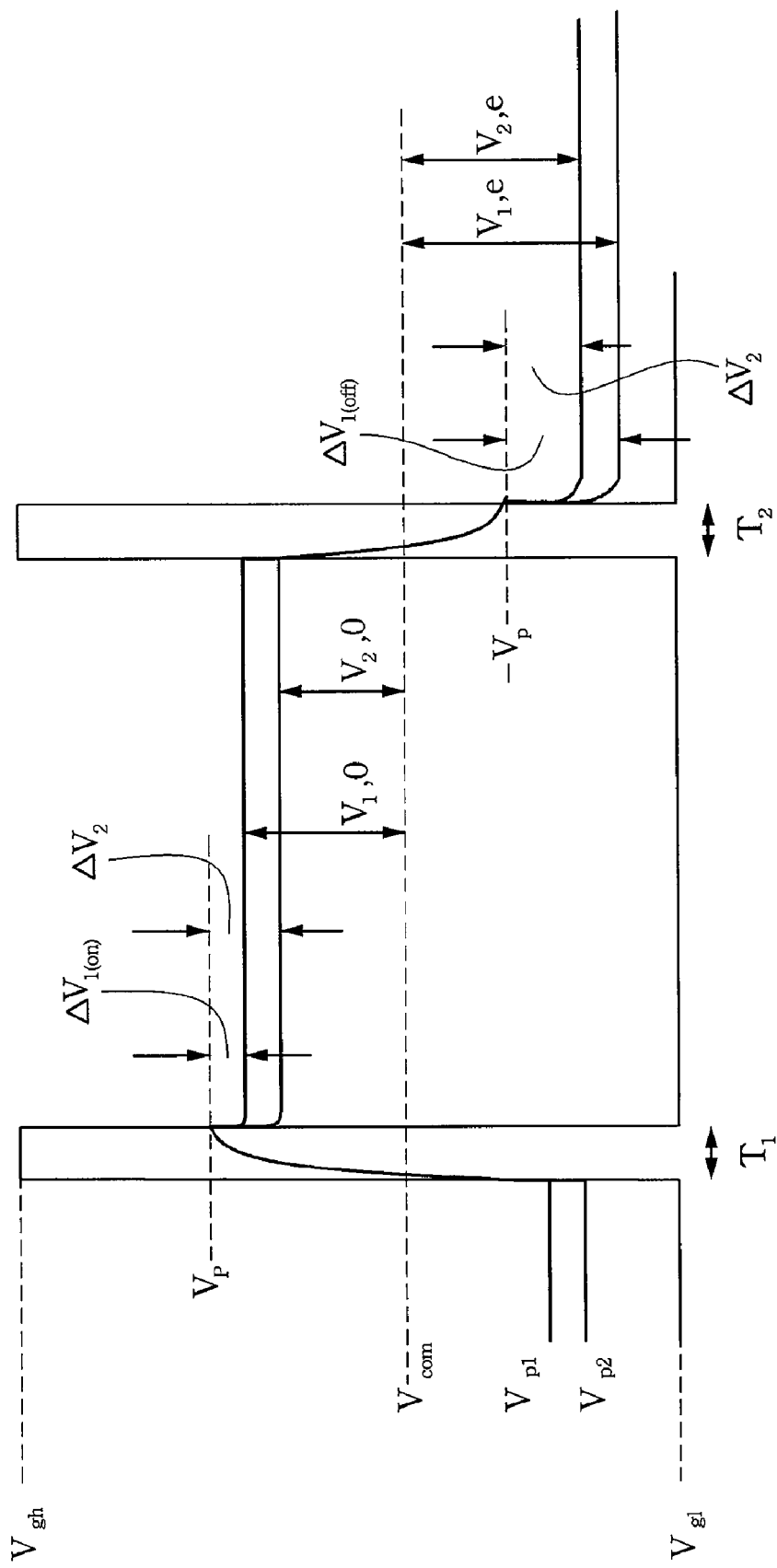
FIG. 6 illustrates a waveform for operating the pixel region in accordance with the first embodiment of the present invention.

FIG. 6 shows a waveform diagram for driving this pixel unit 300 according to the first embodiment of the present invention. Referring to FIGS. 6 and 3, in this embodiment, during the time segment T1 of the odd frame, the scan line 306 is selected and is charged to a high-level state, $V_{gh}$, to turn on the thin film transistors 3021 and 3041. At this time, data, $V_P$, with positive polarity transferred in the data line 308 is transferred to the storage capacitor 3023 and 3043 and the liquid crystal capacitor 3024 and 3044 through the thin film transistors 3021 and 3041. When the time segment T1 is almost complete, the electric potential of the scan line 306 is pulled down to a low-level state, $V_{gL}$, to turn off the thin film transistors 3021 and 3041. At this time, the voltage of the liquid crystal capacitors 3024 and 3044 are maintained by the corresponding storage capacitors 3023 and 3043.

However, the instant the thin film transistors 3021 and 3041 are turned off, the voltage value of the data, $V_P$, may fall by $\Delta V$. The $\Delta V$ is related to the diffusion capacitor between the gate and source electrodes of thin film transistor, liquid crystal capacitor and the storage capacitor. According to the first embodiment, the pixel unit 300 includes sub-pixel 302 and sub-pixel 304. Therefore, the pixel unit includes two $\Delta V$ values, $\Delta V_1$ and $\Delta V_2$, to make the two sub-pixels have different voltage values, $V_{P1}$ and $V_{P2}$. The $\Delta V_1$ value related to the diffusion capacitor 3025 of thin film transistor 3021, liquid crystal capacitor 3204 and the storage capacitor 3023 is shown as follows:

$$\Delta V_1 = (V_{gh} - V_{gL}) \times C_{3025}/(C_{3025} + C_{3024} + C_{3023})$$

The $\Delta V_2$ value related to the diffusion capacitor 3045 of thin film transistor 3041, liquid crystal capacitor 3044 and the storage capacitor 3043 is shown as follows:

$$\Delta V_2 = (V_{gh} - V_{gL}) \times C_{3045}/(C_{3045} + C_{3044} + C_{3043})$$

According to this embodiment, the storage capacitor 3023 is a changeable metal-insulator-semiconductor capacitor. Therefore, during the odd frame for writing positive polarity data, the voltage value of the data, $V_P$, is larger than the bias voltage value, $V_{bias}$. That is the voltage applied to the first metal layer 401 is larger than the voltage applied to the second metal later 402 as shown in the FIG. 4A. In this case, the voltage difference value ($V_{M1} - V_{M2}$) is larger than not only than zero but also the positive threshold voltage value ($V_{thod+}$). According to this embodiment, the storage capacitor 3023 may generate the capacitance $C_{3023,\,on}$ as shown in the FIG. 4B. Therefore, during the odd frame for writing positive polarity data, the $\Delta V_2$ is shown as follows:

$$\Delta V_1(\text{on}) = (V_{gh} - V_{gL}) \times C_{3025}/(C_{3025} + C_{3024} + C_{3023,on})$$

During the even frame for writing negative polarity data time segment T2, the scan line 306 is selected and is charged to a high-level state, $V_{gh}$, to turn on the thin film transistors 3021 and 3041. At this time, data, $-V_P$, with negative polarity transferred in the data line 308 is transferred to the storage capacitor 3023 and 3043 and the liquid crystal capacitors 3024 and 3044 through the thin film transistors 3021 and 3041. When the time segment T2 is almost over, the electric potential of the scan line 306 is pulled down to a low-level state, $V_{gL}$, to turn off the thin film transistors 3021 and 3041. At this time, the voltage of the liquid crystal capacitors 3024 and 3044 are maintained by the corresponding storage capacitors 3023 and 3043.

However, the instant the thin film transistors 3021 and 3041 are turned off, the voltage value of the data, $-V_P$, may fall by $\Delta V$. The $\Delta V$ is related to the diffusion capacitor between the gate and source electrodes of the thin film transistor, liquid crystal capacitor and the storage capacitor.

According to this embodiment, the storage capacitor 3023 is a changeable metal-insulator-semiconductor capacitor. Therefore, during the even frame for writing negative polarity data, the voltage value of the data, $-V_P$, is less than the bias voltage value, $V_{bias}$. That is the voltage applied to the first metal layer 401 is less than the voltage applied to the second metal later 402 as shown in the FIG. 4A. In this case, the voltage difference value ($V_{M1} - V_{M2}$) is less than not only zero but also the negative threshold voltage value ($V_{thod-}$). According to this embodiment, the storage capacitor 3023 may generate the capacitance $C_{3023,\,off}$ as shown in the FIG. 4B. Therefore, during the even frame for writing negative polarity data, the $\Delta V_1$ is shown as follows:

$$\Delta V_1(\text{off}) = (V_{gh} - V_{gL}) \times C_{3025}/(C_{3025} + C_{3024} + C_{3023,off})$$

In the sub-pixel 302, the $\Delta V_2$ value related to the diffusion capacitor 3045 of thin film transistor 3041, the liquid crystal capacitor 3044 and the storage capacitor 3043 is shown as follows:

$$\Delta V_2 = (V_{gh} - V_{gL}) \times C_{3045}/(C_{3045} + C_{3044} + C_{3043})$$

The storage capacitor 3023 is a changeable metal-insulator-semiconductor capacitor. Therefore, for the sub-pixel 302, the voltage change when the negative polarity data is written is different from the voltage change when the positive polarity data is written. According to this embodiment, Because the capacitance $C_{3023,\,on}$ is larger than the capacitance $C_{3023,\,off}$, the voltage change $\Delta V_1(ON)$ when positive polarity data is written is less than the voltage change $\Delta V_1$ (Off) when negative polarity data is written. The storage capacitor 3043 is a metal-insulator-metal capacitor. Therefore, for the sub-pixel 304, the voltage change is always $\Delta V_2$ no matter if the voltage change $\Delta V_2$ occurs when negative polarity data is written or when positive polarity data is written.

According to this embodiment, the capacitance of the diffusion capacitor 3025 is equal to the capacitance of the diffusion capacitor 3045. The capacitance of the liquid crystal capacitor 3024 is equal to the capacitance of the liquid crystal capacitor 3044. The storage capacitor 3023 is a changeable metal-insulator-semiconductor capacitor. Therefore, when positive polarity data is written, the capacitance $C_{3023,\,on}$ of the storage capacitor 3023 is larger than the capacitance of the storage capacitor 3043. On the other hand, when negative polarity data is written, the capacitance $C_{3023,\,off}$ of the storage capacitor 3023 is less than the capacitance of the storage capacitor 3043. Therefore, the relationship of the voltage change values is $\Delta V_1(Off) > \Delta V_2 > \Delta V_1(On)$. In the foregoing embodiment, the diffusion capacitor 3025 is set to be equal to the capacitance of the diffusion capacitor 3045 and the capacitance of the liquid crystal capacitor 3024 is set to be equal to the capacitance of the liquid crystal capacitor 3044. However, the foregoing capacitance set does not limit the present invention.

Please refer to the FIG. 6 again. The storage capacitor 3023 is a changeable metal-insulator-semiconductor capacitor. Therefore, for the sub-pixel 302, the voltage change from writing negative polarity data and the voltage change from writing positive polarity data is different in the instant that the thin film transistors 3021 and 3041 in the sub-pixel 302 are turned off. The storage capacitor 3043 is a non-changeable metal-insulator-metal capacitor. Therefore, for the sub-pixel 304, the voltage change from writing negative polarity data and the voltage change from writing positive polarity data is same in the instant that the thin film transistors 3021 and 3041 in the sub-pixel 302 are turned off. Therefore, in this embodiment, adjusting the capacitance of the storage capacitor 3023 makes the data voltage of the even frame symmetrical to the data voltage of the odd frame in the common electrode $V_{com}$ after the thin film transistors 3021 and 3041 in the sub-pixel 302 are turned off. In other words, for the sub-pixel 302, the data voltage $V_{1,o}$ in the odd frame is equal to the data voltage $V_{1,e}$ in the even frame. For the sub-pixel 304, the data voltage $V_{2,o}$ in the odd frame is equal to the data voltage $V_{2,e}$ in the even frame.

The optical characteristics of the sub-pixel 302 can be evaluated by the root mean square voltage of $V_{1,o}$ and $V_{1,e}$. The optical characteristic of the sub-pixel 304 can be evaluated by the root mean square voltage of $V_{2,o}$ and $V_{2,e}$.

The root mean square voltage value of the sub-pixel 302 is shown as follows:

$$\text{RMS of sub pixel 302} = \sqrt{\frac{V_{1,o}^2 + V_{1,e}^2}{2}}$$

The root mean square voltage value of the sub-pixel 304 is shown as follows:

$$\text{RMS of sub pixel 304} = \sqrt{\frac{V_{2,o}^2 + V_{2,e}^2}{2}}$$

According to the first embodiment, each pixel unit includes two sub-pixels. Therefore, the optical characteristics of the whole pixel region are a combination of the optical characteristics of the two sub-pixels. One of the two sub-pixels has a changeable storage capacitor. Therefore, by adjusting the capacitance of the storage capacitor 3023, the data voltage of the even frame will be symmetrical to the data voltage of the odd frame in the common electrode $V_{com}$. Such a method may optimize the optical characteristic of this whole pixel.

It is noticed that the changeable storage capacitor is located in the sub-pixel 302 in the first embodiment. However, in other embodiments, the changeable storage capacitor is located in the sub-pixel 304. Moreover, in other embodiments, a plurality of changeable storage capacitors is located in the sub-pixel 302 and the sub-pixel 304 respectively. On the other hand, the value of the bias voltage $V_{bias}$ is not be limited in this embodiment. However, in other embodiments, the bias voltage $V_{bias}$ is connected to the common electrode $V_{com}$.

Second Embodiment

Figure 7:
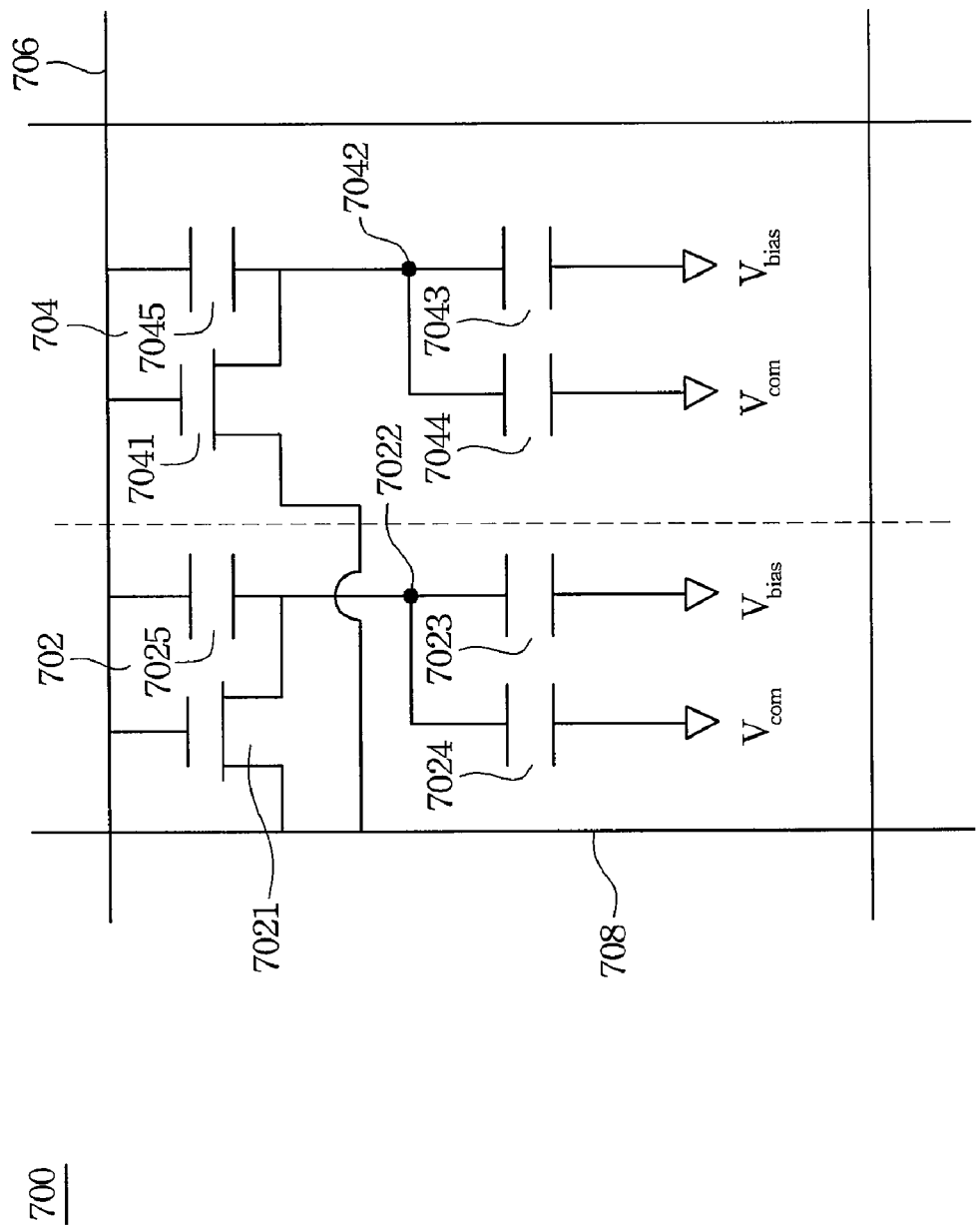
FIG. 7 illustrates a schematic diagram of a pixel unit according to the second embodiment of the present invention.

FIG. 7 is a schematic diagram of a pixel unit according to the second embodiment of the present invention. The pixel unit 700 includes two sub-pixels 702 and 704.

The sub-pixel 702 includes a thin film transistor 7021. According to the thin film transistor 7021, the gate electrode is connected to the scanning line 706, the drain electrode is connected to the data line 708 and the source electrode is connected to the pixel electrode 7022. The storage capacitor 7023 is composed of the pixel electrode 7022 and the bias electrode $V_{bias}$. The liquid crystal capacitor 7024 is composed of the pixel electrode 7022 and the common electrode $V_{com}$. A diffusion capacitor 7025 exists between the gate and the source electrode of the thin film transistor 7021.

The sub-pixel 704 includes a thin film transistor 7041. According to the thin film transistor 7041, the gate electrode is connected to the scan line 706, the drain electrode is connected to the data line 708 and the source electrode is connected to the pixel electrode 7042. The storage capacitor 7043 is composed of the pixel electrode 7042 and the bias electrode $V_{bias}$. The liquid crystal capacitor 7044 is composed of the pixel electrode 7042 and the common electrode $V_{com}$. A diffusion capacitor 7045 exists between the gate and the source electrode of the thin film transistor 7041.

In this embodiment, a metal-insulator-semiconductor-metal structure, MIS structure, is used to form the storage capacitor 7023. A metal-insulator-metal structure is used to form the storage capacitor 7043.

The storage capacitor 7023 with a metal-insulator-semiconductor-metal structure is shown in the FIG. 4A. The relation diagram between the capacitance and the voltage difference value $(V_{M1} - V_{M2})$ is shown in the FIG. 4B. As described in the foregoing first embodiment, when the voltage difference value $(V_{M1} - V_{M2})$ is larger than a positive threshold voltage value $(V_{thod+})$ or less than a negative threshold voltage value $(V_{thod-})$, the capacitance tends to a specific positive value or a specific negative value. In this embodiment, the capacitor may generate the capacitance $C_{7023,\,on}$ when the voltage difference value that is larger than the positive threshold voltage value $(V_{thod+})$ is applied to this capacitor. The capacitor may generate the capacitance $C_{7023,\,off}$ when the voltage difference value that is less than the negative threshold voltage value ($V_{thod-}$) is applied to this capacitor.

The main difference between the first embodiment and the second embodiment is the connection structure between the storage capacitor and the thin film transistor. In the first embodiment, the first metal layer of the storage capacitor 3023 is connected to the source electrode structure of the thin film transistor 3021 through a through hole and the second metal layer of the storage capacitor 3023 is connected to the bias voltage $V_{bias}$. However, in the second embodiment, the first metal layer of the storage capacitor 7023 is connected to the bias voltage $V_{bias}$ and the second metal layer of the storage capacitor 7023 is connected to the source electrode structure of the thin film transistor 7021.

Figure 8A:
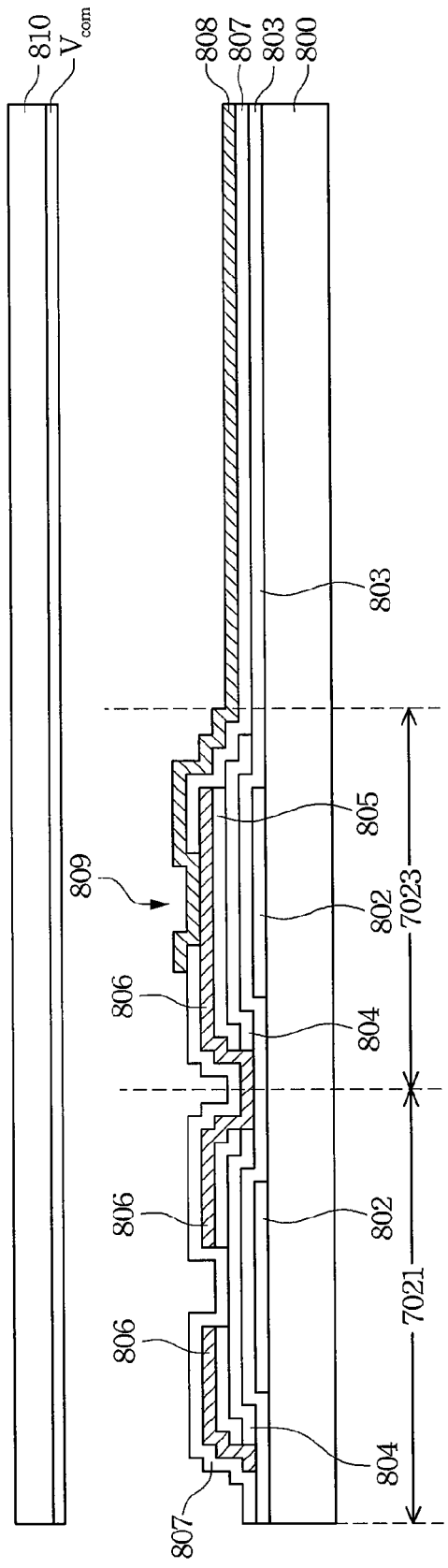
FIG. 8A illustrates a cross-sectional view of a sub-pixel in accordance with the second embodiment of the present invention.
Figure 8B:
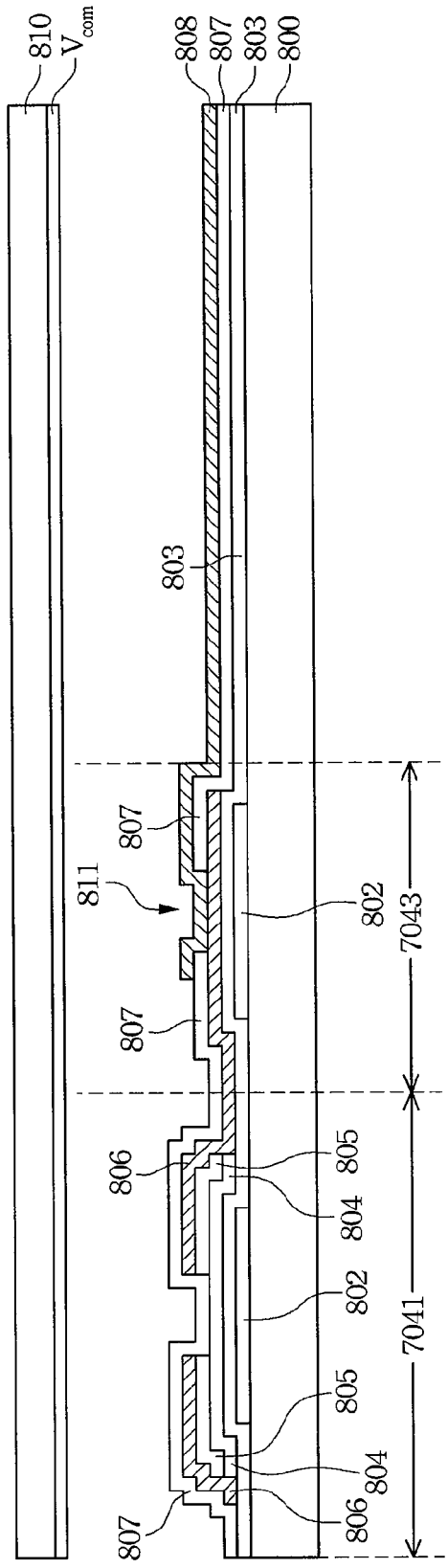
FIG. 8B illustrates a cross-sectional view of a sub-pixel in accordance with the second embodiment of the present invention.

Many pixel structure types may be used to form the pixel unit 700. FIG. 8A and FIG. 8B illustrates one of the pixel structure types. FIG. 8A is a schematic diagram of the thin film transistor 7021 and the metal-insulator-semiconductor (MIS) storage capacitor 7023 in the sub-pixel 702. FIG. 8B is a schematic diagram of the thin film transistor 7041 and the metal-insulator-metal (MIM) storage capacitor 7043 in the sub-pixel 704. In FIG. 8A, in sub-pixel 702, the common electrode $V_{com}$ is formed over a glass substrate 810. The thin film transistor 7021 and the metal-insulator-semiconductor (MIS) storage capacitor 7023 are formed over a glass substrate 800. A metal layer 802 is formed over the glass substrate 800 to serve as the gate metal of the thin film transistor 7021 and the first metal layer 401 (shown in the FIG. 4A) of the storage capacitor 7023. An insulator layer 803 is formed over the glass substrate 800 to cover the metal layer 802 to serve as the gate insulator of the thin film transistor 7021 and the insulator layer 403 (shown in the FIG. 4A) of the storage capacitor 7023. An amorphous silicon layer 804 and n+ amorphous silicon layer 805 are sequentially formed over the gate insulator of the thin film transistor 7021 and the insulator layer 403 of the storage capacitor 7023. The amorphous silicon layer 804 and the n+amorphous silicon layer 805 are used as a semiconductor layer of the thin film transistor 7021 and used as the semiconductor layer 404 (shown in the FIG. 4A) of the storage capacitor 7023. A metal layer 806 is formed over the n+ amorphous silicon layer 805. The metal layer 806, the amorphous silicon layer 804 and the n+ amorphous silicon layer 805 form the source and the drain electrode structure. A metal layer 806 is used as the second metal layer 402 (shown in the FIG. 4A) of the storage capacitor 7023. It is noticed that in this embodiment, the source electrode of the thin film transistor 7021 is connected to the second metal layer of the storage capacitor 7023. The drain electrode of the thin film transistor 7021 is connected to the data line. A passivation layer 807 is formed over the glass substrate 800 to cover the source and the drain electrode structure of the thin film transistor 7021 and the second metal layer 402 (shown in the FIG. 4A) of the storage capacitor 7023. A through hole 809 is formed in the passivation layer 807 to expose the second metal layer of the storage capacitor 7023. An indium tin oxide, ITO, layer 808 is formed over the passivation layer 807 to connect with the second metal layer 402 of the storage capacitor 7023 to serve as the pixel electrode 7022 of the sub-pixel 702. The diffusion capacitor 7025 (shown in the FIG. 7) is composed of the gate metal layer 802 and the source electrode structure of the thin film transistor 7021. The liquid crystal capacitor 7024 (shown in the FIG. 7) is composed of the ITO layer 808 and the common electrode $V_{com}$ formed over the glass substrate 810.

In FIG. 8B, in sub-pixel 704, the common electrode $V_{com}$ is formed over the glass substrate 810. The thin film transistor 7041 and the metal-insulator-metal (MIM) storage capacitor 7043 are formed over the glass substrate 800. A metal layer 802 is formed over the glass substrate 800 to serve as the gate metal of the thin film transistor 7041 and the first electrode of the storage capacitor 7043. An insulator layer 803 is formed over the glass substrate 800 to cover the metal layer 802 to serve as the gate insulator of the thin film transistor 7041 and the insulator layer of the storage capacitor 7043. An amorphous silicon layer 804 and an n+ amorphous silicon layer 805 sequentially formed over the gate insulator are used as semiconductor layers of the thin film transistor 7041. A metal layer 806 is formed over the source electrode and the drain electrode of the thin film transistor 7041 and the insulator layer of the storage capacitor 7043. The metal layer 806, the amorphous silicon layer 804 and the n+ amorphous silicon layer 805 form the source and the drain electrode structure of the thin film transistor 7041. The metal layer 806 is also used as the second electrode of the storage capacitor 7043. In this embodiment, the source electrode of the thin film transistor 7041 is connected to the second electrode of the storage capacitor 7043. The drain electrode of the thin film transistor 7041 is connected to the data line. A passivation layer 807 is formed over the glass substrate 800 to cover the source and the drain electrode structure of the thin film transistor 7041 and the second electrode of the storage capacitor 7043. A through hole 811 is formed in the passivation layer 807 to expose the second electrode of the storage capacitor 7043. An indium tin oxide, ITO, layer 808 is formed over the passivation layer 807 to connect with the second electrode of the storage capacitor 7043. The diffusion capacitor 7045 (shown in the FIG. 7) is composed of the gate metal layer 802 and the source electrode structure of the thin film transistor 7041. The liquid crystal capacitor 7044 (shown in the FIG. 7) is composed of the ITO layer 808 and the common electrode $V_{com}$ formed over the glass substrate 810.

Figure 9:
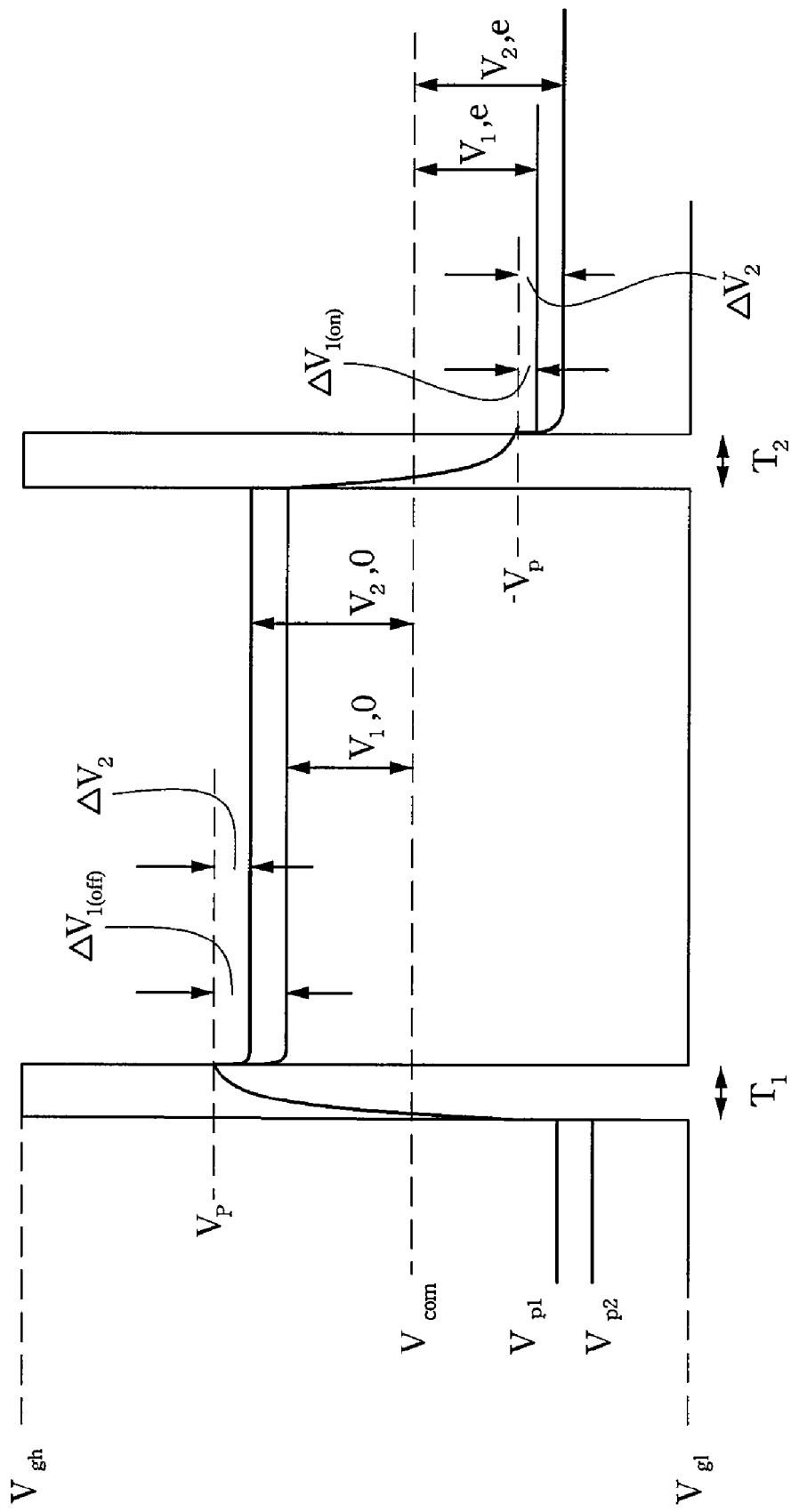
FIG. 9 illustrates a waveform for operating the pixel region in accordance with the second embodiment of the present invention.

FIG. 9 shows a waveform diagram for driving this pixel unit 700 according to the second embodiment of the present invention. Referring to FIG. 7 and FIG. 9, in this embodiment, during the time segment T1 of the odd frame, the scan line 706 is selected and is charged to a high-level state, $V_{gh}$, to turn on the thin film transistors 7021 and 7041. At this time, data, $V_P$, with positive polarity transferred in the data line 708 is transferred to the storage capacitor 7023 and 7043 and the liquid crystal capacitor 7024 and 7044 through the thin film transistors 7021 and 7041. When the time segment T1 is almost over, the electric potential of the scan line 706 is pulled down to a low-level state, $V_{gL}$, to turn off the thin film transistors 7021 and 7041. At this time, the voltage of the liquid crystal capacitors 7024 and 7044 are maintained by the corresponding storage capacitors 7023 and 7043.

However, the instant the thin film transistors 7021 and 7041 are turned off, the voltage value of the data, $V_P$, may fall by ΔV. The ΔV is related to the diffusion capacitor, liquid crystal capacitor and the storage capacitor.

According to the second embodiment, the storage capacitor 7023 is a changeable metal-insulator-semiconductor capacitor as shown in FIG. 4A. Therefore, during the odd frame for writing positive polarity data, the voltage value of the data, $V_P$, is larger than the bias voltage value, $V_{bias}$. That is the voltage applied to the second metal later 402 is larger than the voltage applied to the first metal layer 401 as shown in the FIG. 4A. In this case, the voltage difference value ($V_{M1}-V_{M2}$) is less than not only zero but also a negative threshold voltage value ($V_{thod-}$). According to this embodiment, the storage capacitor 7023 may generate the capacitance $C_{7023,\,off}$ as shown in the FIG. 4B. Therefore, during the odd frame for writing positive polarity data, the $\Delta V_1$ is shown as follows:

$$\Delta V_1(\text{off}) = (V_{gh} - V_{gL}) \times C_{7025}/(C_{7025} + C_{7024} + C_{7023,off})$$

The $\Delta V_2$ value related to the diffusion capacitor 7045 of thin film transistor 7041, liquid crystal capacitor 7044 and the storage capacitor 7043 is shown as follows:

$$\Delta V_2 = (V_{gh} - V_{gL}) \times C_{7045}/(C_{7045} + C_{7044} + C_{7043})$$

During the even frame for writing negative polarity data time segment T2, the scan line 706 is selected and is charged to a high-level state, $V_{gh}$, to turn on the thin film transistors 7021 and 7041. At this time, data, $-V_P$, with negative polarity transferred in the data line 708 is transferred to the storage capacitor 7023 and 7043 and the liquid crystal capacitor 7024 and 7044 through the thin film transistors 7021 and 7041. When the time segment T2 being almost over, the electric potential of the scan line 706 is pulled down to a low-level state, $V_{gL}$, to turn off the thin film transistors 7021 and 7041. At this time, the voltage of the liquid crystal capacitors 7024 and 7044 are maintained by the corresponding storage capacitors 7023 and 7043.

However, the instant the thin film transistors 7021 and 7041 are turned off, the voltage value of the data, $-V_P$, may fall by $\Delta V$. The $\Delta V$ is related to the diffusion capacitor, the liquid crystal capacitor and the storage capacitor.

According to this embodiment, the storage capacitor 7023 is a changeable metal-insulator-semiconductor capacitor as shown in the FIG. 4A. Therefore, during the even frame for writing negative polarity data, the voltage value of the data, $-V_P$, is less than the bias voltage value, $V_{bias}$. That is the voltage applied to the first metal layer 401 is larger than the voltage applied to the second metal later 402 as shown in the FIG. 4A. In this case, the voltage difference value ($V_{M1}$31 $V_{M2}$) is larger than not only zero but also the positive threshold voltage value ($V_{thod+}$). According to this embodiment, the storage capacitor 7023 may generate the capacitance $C_{7023,on}$ as shown in the FIG. 4B. Therefore, during the even frame for writing negative polarity data, the $\Delta V_1$ is shown as follows:

$$\Delta V_1(\text{on}) = (V_{gh} - V_{gL}) \times C_{7025}/(C_{7025} + C_{7024} + C_{7023,on})$$

In the sub-pixel 704, the $\Delta V_2$ value related to the diffusion capacitor 7045 of thin film transistor 7041, liquid crystal capacitor 7044 and the storage capacitor 7043 is shown as follows:

$$\Delta V_2 = (V_{gh} - V_{gL}) \times C_{7045}/(C_{7045} + C_{7044} + C_{7043})$$

The storage capacitor 7023 is a changeable metal-insulator-semiconductor capacitor. Therefore, for the sub-pixel 702, the voltage change when negative polarity data is written is different from the voltage change when positive polarity data is written. Because the capacitance $C_{7023,on}$ is larger than the capacitance $C_{7023,off}$, the voltage change$\Delta V_1$(ON) when negative polarity data is written is smaller than the voltage change $\Delta V_1$(Off) when positive polarity data is written. The storage capacitor 7043 is a metal-insulator-metal capacitor. Therefore, for the sub-pixel 704, the voltage change is always $\Delta V_2$ no matter when negative polarity data is written or when positive polarity data is written.

According to this embodiment, the capacitance of the diffusion capacitor 7025 is equal to the capacitance of the diffusion capacitor 7045. The capacitance of the liquid crystal capacitor 7024 is equal to the capacitance of the liquid crystal capacitor 7044. The storage capacitor 7023 is a changeable metal-insulator-semiconductor capacitor. Therefore, when positive polarity data is written, the capacitance $C_{7023,off}$ of the storage capacitor 7023 is less than the capacitance of the storage capacitor 7043. On the other hand, when negative polarity data is written, the capacitance $C_{7023,on}$, of the storage capacitor 7023 is larger than the capacitance of the storage capacitor 7043. Therefore, the relationship of the voltage change value is $\Delta V_1(\text{Off}) > \Delta V_2 > \Delta V_1(\text{On})$.

Please refer to the FIG. 9 again. The storage capacitor 7023 is a changeable metal-insulator-semiconductor capacitor. Therefore, for the sub-pixel 702, the voltage change for writing negative polarity data and the voltage change for writing positive polarity data is different in the instant that the thin film transistors 7021 and 7041 are turned off. The storage capacitor 7043 is a non-changeable metal-insulator-metal capacitor. Therefore, for the sub-pixel 704, the voltage change for writing negative polarity data and the voltage change for writing positive polarity data is the same in the instant that the thin film transistors 7021 and 7041 are turned off. Therefore, in this embodiment, adjusting the capacitance of the storage capacitor 7023 makes the data voltage of the even frame symmetrical to the data voltage of the odd frame in the common electrode $V_{com}$ after the thin film transistors 7021 and 7041 are turned off. In other words, for the sub-pixel 702, the data voltage $V_{1,o}$ in the odd frame is equal to the data voltage $V_{1,e}$ in the even frame. For the sub-pixel 704, the data voltage $V_{2,o}$ in the odd frame is equal to the data voltage $V_{2,e}$ in the even frame.

Also, the optical characteristic of the sub-pixel 702 can be evaluated by the root mean square voltage of $V_{1,0}$ and $V_{1,e}$, and the optical characteristic of the sub-pixel 704 can be evaluated by the root mean square voltage of $V_{2,0}$ and $V_{2,e}$, like in the foregoing first embodiment According to the second embodiment, each pixel unit includes two sub-pixels. Therefore, the optical characteristic of the whole pixel region is the combination of the optical characteristics of the two sub-pixels. One of the two sub-pixels has a changeable storage capacitor. Therefore, by adjusting the capacitance of the storage capacitor 7023, the data voltage of the even frame will be symmetrical to the data voltage of the odd frame in the common electrode $V_{com}$. Such a method may optimize the optical characteristics of this whole pixel.

Similarly, according to this embodiment, the changeable storage capacitor is located in the sub-pixel 702 in the second embodiment. However, in other embodiments, the changeable storage capacitor is located in the sub-pixel 704. Moreover, in other embodiments, a plurality of changeable storage capacitors is located in the sub-pixel 702 and the sub-pixel 704 respectively. On the other hand, the value of the bias voltage $V_{bias}$ is not limited in this embodiment. However, in other embodiments, the bias voltage $V_{bias}$ is connected to the common electrode $V_{com}$.

Accordingly, each pixel unit includes two sub-pixels. Each sub-pixel includes a storage capacitor, a liquid crystal capacitor and a thin film transistor. One of the storage capacitors is a changeable capacitor or voltage control capacitor. By adjusting the capacitance of the changeable storage capacitor, the data voltage of the even frame is symmetrical to the data voltage of the odd frame in the common electrode $V_{com}$ after the thin film transistors are turned off to improve the optical characteristic of the pixel unit.

As is understood by a person skilled in the art, the foregoing descriptions of the preferred embodiment of the present invention are an illustration of the present invention rather than a limitation thereof. Various modifications and similar arrangements are included within the spirit and scope of the appended claims. The scope of the claims should be accorded to the broadest interpretation so as to encompass all such modifications and similar structures. While a preferred embodiment of the invention has been illustrated and described, it will be appreciated that various changes can be made therein without departing from the spirit and scope of the invention.

What is claimed is:

1. A liquid crystal display, comprising:
a first substrate;
a plurality of data lines crossing a plurality of scan lines to define a plurality of pixel units in the first substrate, wherein each pixel unit is defined by adjacent two scan lines, a first scan line and a second scan line, and adjacent two data lines, a first data line and a second data line, each pixel unit includes:
a first sub-pixel and a second sub-pixel;
a first transistor located in the first sub-pixel, a gate electrode of the first transistor is connected to the first scan line and a drain electrode of the first transistor is connected to the first data line;
a first storage capacitor located in the first sub-pixel and the first storage capacitor is coupled to the first transistor;
a second transistor located in the second sub-pixel, a gate electrode of the second transistor is connected to the first scan line and a drain electrode of the second transistor is connected to the first data line; and
a second storage capacitor located in the second sub-pixel and the second storage capacitor is coupled to the second transistor, wherein the first storage capacitor and the second storage capacitor are both connected to a same bias line, and at least one of the first storage capacitor and the second storage capacitor is a metal-insulator-semiconductor capacitor, which includes a first metal layer, an insulator formed over the first metal layer, a semiconductor layer formed over the insulator layer and a second metal layer formed over the semiconductor layer.

2. The liquid crystal display of claim 1, wherein the first transistor has a gate electrode coupled to a first scan line, a drain electrode coupled to a first data line and a source electrode coupled to the first storage capacitor, and the second transistor has a gate electrode coupled to the first scan line, a drain electrode coupled to the first data line and a source electrode coupled to the second storage capacitor.

3. The liquid crystal display of claim 1, wherein the changeable capacitor is a metal-insulator-semiconductor capacitor.

4. The liquid crystal display of claim 3, wherein the metal-insulator-semiconductor capacitor includes a first metal layer, an insulator formed over the first metal layer, a semiconductor layer formed over the insulator layer and a second metal layer formed over the semiconductor layer.

5. The liquid crystal display of claim 4, wherein the semiconductor layer includes an amorphous silicon layer and an n+amorphous silicon layer.

6. The liquid crystal display of claim 4, wherein the first metal layer is coupled to the source electrode of the first transistor, and the second metal layer is coupled to a bias electrode.

7. The liquid crystal display of claim 6, wherein when the voltage value of the bias electrode is less than the voltage value of the source electrode, the metal-insulator-semiconductor capacitor has a first capacitance, and when the voltage value of the bias electrode is larger than the voltage value of the source electrode, the metal-insulator-semiconductor capacitor has a second capacitance, wherein the first capacitance is larger than the second capacitance.

8. The liquid crystal display of claim 4, wherein the first metal layer is coupled to a bias electrode and the second metal layer is coupled to the source electrode of the first transistor.

9. The liquid crystal display of claim 8, wherein when the voltage value of the bias electrode is less than the voltage value of the source electrode, the metal-insulator-semiconductor capacitor has a first capacitance, and when the voltage value of the bias electrode is larger than the voltage value of the source electrode, the metal-insulator-semiconductor capacitor has a second capacitance, wherein the first capacitance is less than the second capacitance.

10. The liquid crystal display of claim 1, further comprising a first pixel electrode located in the first sub-pixel and coupled to the source electrode of the first transistor, and a second pixel electrode located in the second sub-pixel and coupled to the source electrode of the second transistor.

11. The liquid crystal display of claim 10, further comprising a second substrate facing the first substrate, wherein a common electrode is located in the second substrate.

12. The liquid crystal display of claim 11, wherein the common electrode and the first pixel electrode form a first liquid crystal capacitor, and the common electrode and the second pixel electrode form a second liquid crystal capacitor.

* * * * *